United States Patent [19]
Graf et al.

[11] Patent Number: 5,547,434
[45] Date of Patent: Aug. 20, 1996

[54] CONTROL FOR A MOTOR VEHICLE DRIVE HAVING AN AUTOMATIC TRANSMISSION

[75] Inventors: Friedrich Graf; Dieter Brückner, both of Regensburg, Germany

[73] Assignee: Siemens Aktiengesellschaft, Munich, Germany

[21] Appl. No.: 276,165

[22] Filed: Jul. 15, 1994

Related U.S. Application Data

[63] Continuation-in-part of Ser. No. 934,577, Aug. 24, 1992, abandoned.

[30] Foreign Application Priority Data

Aug. 22, 1991 [EP] European Pat. Off. .............. 91114113

[51] Int. Cl.⁶ .................................................. B60K 41/04
[52] U.S. Cl. ................................. 477/109; 477/110
[58] Field of Search ........................... 477/77, 78, 109, 477/110, 115, 138, 156; 123/90.15, 418, 335; 364/424.1

[56] References Cited

U.S. PATENT DOCUMENTS

| | | | |
|---|---|---|---|
| 4,355,550 | 10/1982 | Will et al. | 477/102 |
| 4,403,527 | 9/1983 | Mohl et al. | 477/32 |
| 4,520,694 | 6/1985 | Eschrich et al. | 477/109 |
| 4,800,781 | 1/1989 | Yasue et al. | 477/98 |
| 4,889,014 | 12/1989 | Iwata | 477/101 |
| 4,890,515 | 1/1990 | Taniguchi et al. | 477/151 |
| 4,945,481 | 7/1990 | Iwatsuki et al. | 364/424.1 |
| 5,022,370 | 6/1991 | Ferguson et al. | 123/425 |
| 5,048,372 | 9/1991 | Sodeno et al. | 477/102 |
| 5,056,378 | 10/1991 | Aimone et al. | 477/109 |
| 5,086,666 | 2/1992 | Moriki | 477/109 |
| 5,178,041 | 1/1993 | Takada | 477/109 |
| 5,184,577 | 2/1993 | Kato et al. | 123/90.15 |
| 5,291,802 | 3/1994 | Kuriyama | 477/109 |
| 5,325,740 | 7/1994 | Zhang et al. | 477/110 |
| 5,335,568 | 8/1994 | Kammeri et al. | 477/109 |
| 5,383,824 | 1/1995 | Runge et al. | 477/110 |

FOREIGN PATENT DOCUMENTS

| | | |
|---|---|---|
| 3712499 | 10/1987 | Germany . |
| 2935916 | 12/1989 | Germany . |

OTHER PUBLICATIONS

Electronics Newsletter YY 87020, Feb. 19, 1987, 4 pages.

*Primary Examiner*—Khoi Q. Ta
*Attorney, Agent, or Firm*—Herbert L. Lerner; Laurence A. Greenberg

[57] ABSTRACT

A motor vehicle drive has an engine and an automatic transmission. A control for the motor vehicle drive includes an engine control connected to the engine for controlling the torque of the engine. A transmission control is connected to the transmission for controlling shifting operations of the transmission and is connected to the engine control for sending a tripping signal to the engine control for changing torque and effecting a jerk-free shifting operation. Data are exchanged between the engine control and the transmission control preceding the tripping signal, by transmitting a proportion from the engine control to the transmission control for maximally reducing the torque of the engine for the shifting operation.

7 Claims, 4 Drawing Sheets

CONTROL FOR A MOTOR VEHICLE DRIVE HAVING AN AUTOMATIC TRANSMISSION

CROSS REFERENCE TO RELATED APPLICATION

This application is a continuation-in-part of Ser. No. 07/934,577, filed Aug. 24, 1992 now abandoned.

BACKGROUND OF THE INVENTION

FIELD OF THE INVENTION

The invention relates to a control for a motor vehicle drive having an automatic transmission, including an engine control through which the torque of the engine is controlled; a transmission control through which the shifting operations of the transmission are controlled and through which the engine control is made to change torque with a tripping signal, which effects a jerk-free shifting operation; and a data exchange between the engine control and the transmission control preceding the tripping signal.

Such a control is used for motor vehicle drives that have automatic transmissions and that have an engine control and a separate transmission control.

An engine control unit in a control system known from German Patent DE 29 35 916 C2, corresponding to U.S. Pat. No. 4,403,527, includes a plurality of performance graphs for various operating states of the engine. Upon initiation of a shifting operation, the transmission control sends the engine control an intervention signal, by means of which a shift from a first to a second performance graph is made. The second performance graph includes reduced values for the engine torque, for instance in order to damp the increase in moment from the engagement of a free-running clutch in the automatic transmission and thus to reduce the jerk or jolt upon shifting or the wear of slipping friction elements in the transmission. The controlled variable for reducing the engine torque is the ignition angle, which is adjusted in the direction of retarding ignition, but the fuel injection quantity may also be reduced.

Upon an adjustment of the ignition angle that is initiated unilaterally by the transmission control, difficulties can arise if the engine control cannot carry out the desired ignition angle adjustment. With a predetermined basic performance graph for determining the ignition angle, for instance, that happens whenever that angle can be adjusted only to a limited extent as compared with the basic value. Such a limitation must be expected above all if the engine control is provided with means for knocking regulation and if that means is active. Its control variable is likewise the ignition angle. Problems can also arise in shifting that takes place in ranges in which there is an increased tendency toward knocking. The tendency toward knocking is in fact even further increased by upshifting. As a rule, activated knocking regulation means cause a power loss, which leads to the desire for more power on the part of the motor vehicle driver and accordingly may cause the driver to downshift again by flooring the gas pedal. The overall result is an unfavorable shifting performance of the automatic transmission. Moreover, in such a case the knocking regulation and the engine intervention by the transmission overlap in an uncontrollable manner.

SUMMARY OF THE INVENTION

It is accordingly an object of the invention to provide a control for a motor vehicle drive having an automatic transmission, which overcomes the hereinafore-mentioned disadvantages of the heretofore-known devices of this general type, which improves control of the motor vehicle drive, and which attains comfortable shifting and low wear of the friction elements of the clutch, even in the aforementioned problem ranges.

With the foregoing and other objects in view there is provided, in accordance with the invention, in a motor vehicle drive having an engine and an automatic transmission, a control for the motor vehicle drive, comprising an engine control connected to the engine for controlling torque of the engine; a transmission control connected to the transmission for controlling shifting operations of the transmission and connected to the engine control for sending a tripping signal to the engine control for changing torque and effecting a jerk or jolt-free shifting operation; and means for exchanging data between the engine control and the transmission control preceding the tripping signal, by transmitting a proportion from the engine control to the transmission control for maximally reducing the torque of the engine for the shifting operation.

In accordance with another feature of the invention, the transmission has clutches with an operating pressure and a slipping time, and the transmission control adapts the operating pressure of the clutches of the transmission to a maximum torque change for keeping the slipping time of the clutches within an allowable range in the shifting operation.

In accordance with a further feature of the invention, the transmission has clutches with an operating pressure and a slipping time, and including an adaptation circuit controlling the operating pressure of the clutches of the transmission for keeping the slipping time of the clutches within an allowable range, the adaptation circuit being deactivated during the shifting operation.

In accordance with an added feature of the invention, there are provided means for transmitting data in the form of a prior notification of a planned shifting operation from the transmission control to the engine control, after which the engine control varies a closed or open-loop control range for the engine.

In accordance with an additional feature of the invention, there are provided knocking regulating means having a control range being reduced by the engine control.

In accordance with yet another feature of the invention, the engine has a camshaft, and the engine control reduces a control range for the engine torque by adjusting the camshaft.

In accordance with yet a further feature of the invention, the means for exchanging data are a bidirectional data line connected between the engine control and the transmission control.

In accordance with a concomitant feature of the invention, the engine control has a torque reduction circuit.

The advantages of the invention are especially that the shifting operations proceed without jerking or jolting, and overly frequent upshifting and downshifting are avoided.

Other features which are considered as characteristic for the invention are set forth in the appended claims.

Although the invention is illustrated and described herein as embodied in a control for a motor vehicle drive having an automatic transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advan-

DESCRIPTION OF THE PREFERRED EMBODIMENTS

Figure 1:
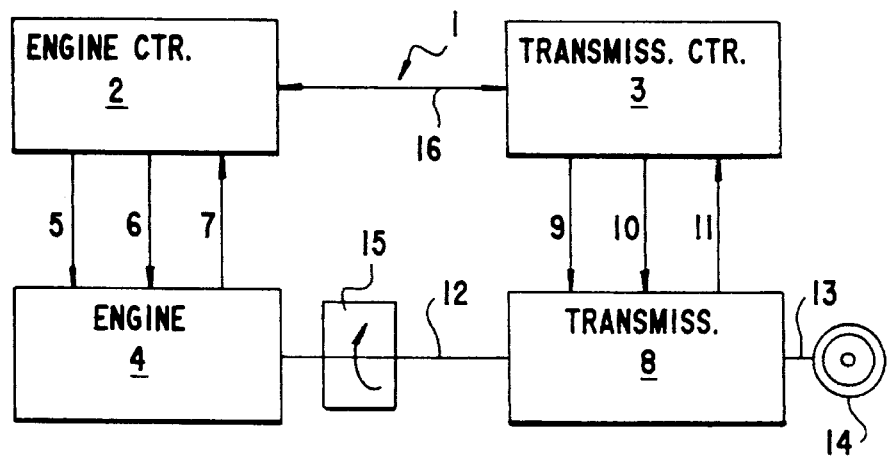
FIG. 1 is a block circuit diagram of a control according to the invention for a motor vehicle drive with an automatic transmission.

Referring now to the figures of the drawing in detail and first, particularly, to FIG. 1 thereof, there is seen a motor vehicle drive control 1 having an engine control 2 and a transmission control 3. The engine control 2 controls an engine 4 and to that end is connected to it by signal lines. Three of the signal lines that are relevant in this case are explained below. Signals for controlling the instant of ignition of spark plugs are carried from the engine control 2 to the engine 4 over a line 5. Signals for controlling injection valves are carried from the engine control 2 to the engine 4 over a line 6. Sensor signals, for example from knocking sensors, are transmitted by the engine 4 to the engine control 2 over a line 7.

It follows that the controls can be performed in open loop or closed loop mode as is well-known from the teachings of automatic control technology.

The transmission control 3 controls a transmission 8. To that end, the transmission control 3 is connected with the transmission 8 by three signal lines which are described below. The clutch pressure in the transmission is controlled over a line 9. Shifting signals for shifting various gears are transmitted to the transmission over a line 10. Sensor signals, such as rpm signals, pass from the transmission 8 to the transmission control 3 over a line 11. In this case, both the line 7 and the line 11 are simply examples of lines for many sensor signals to be transmitted.

Figure 4:
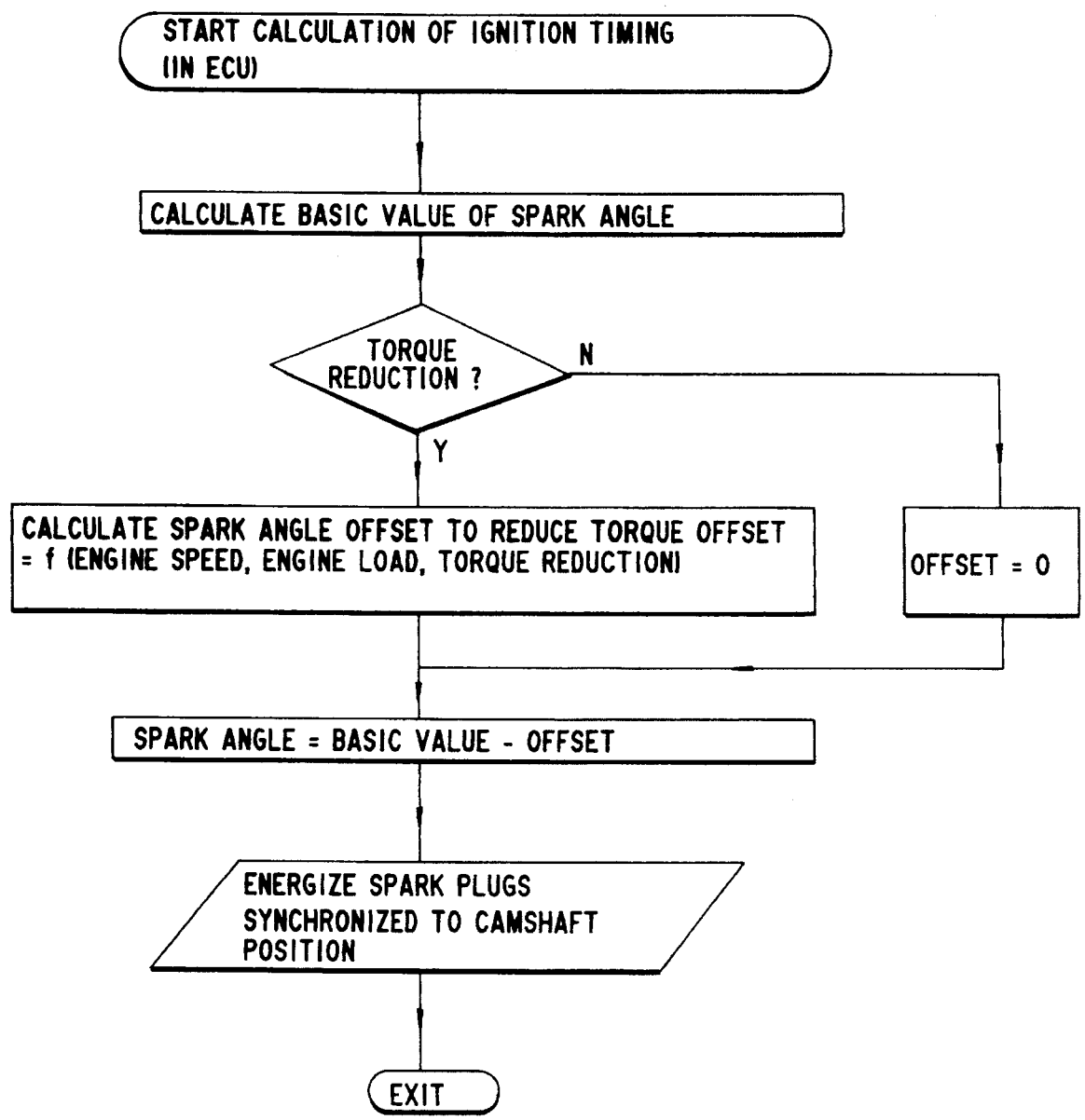
FIG. 4 is a flowchart showing torque reduction based on reduced spark angle.
Figure 5:
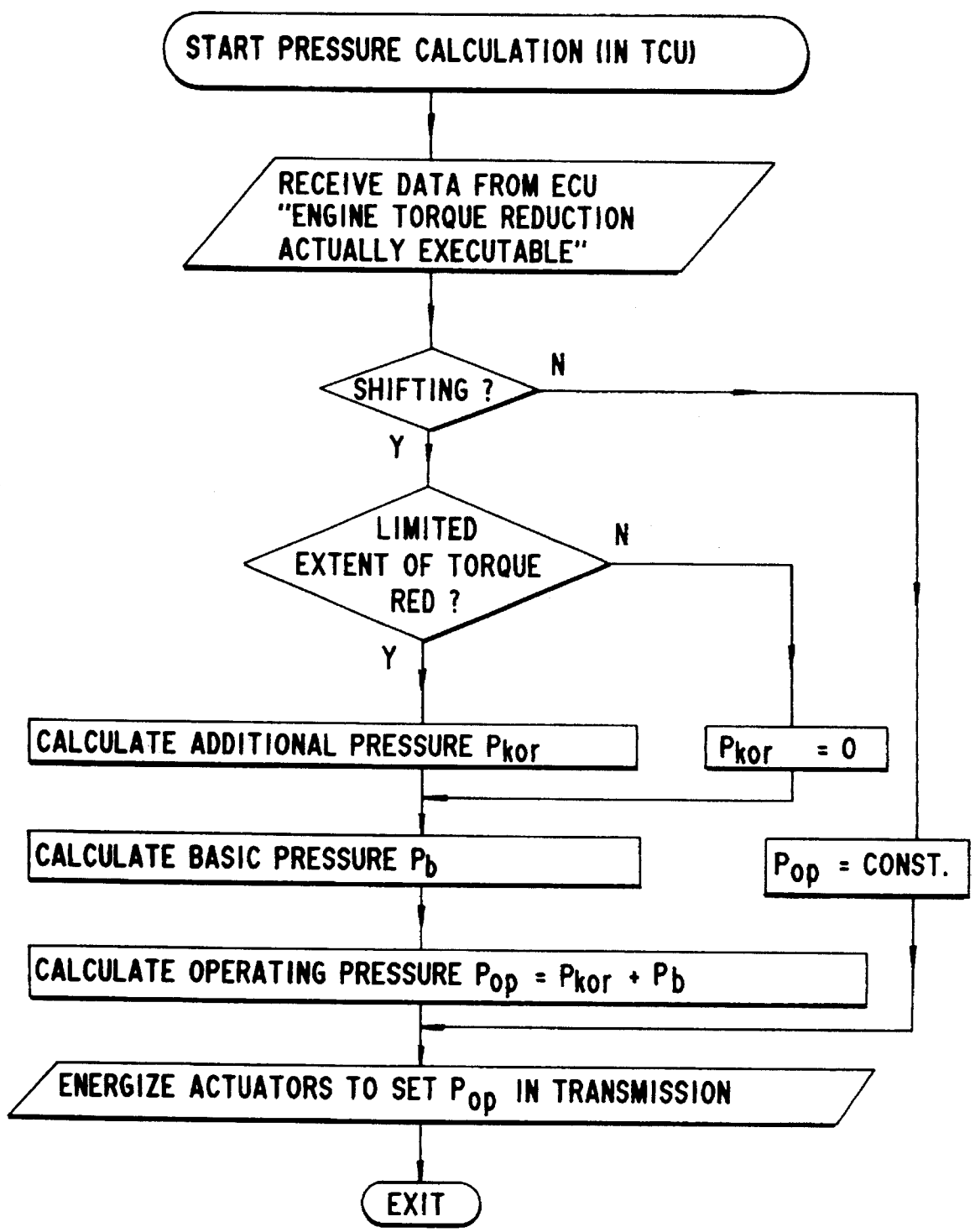
FIG. 5 is a flowchart showing shifting based on data from the engine control unit.
Figure 6:
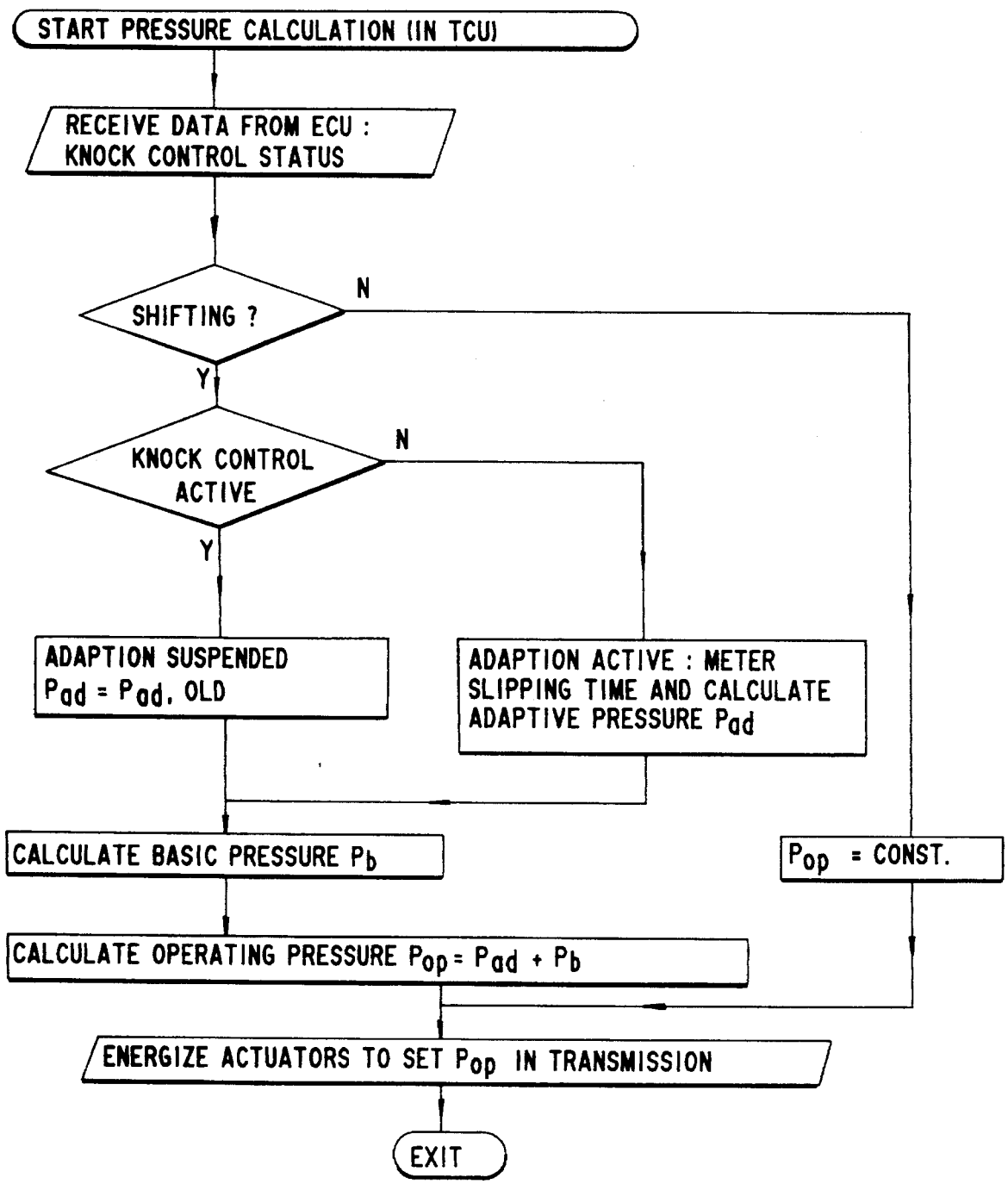
FIG. 6 is a flowchart showing shifting based on knock control data from the engine control unit.

It should be noted that the invention may not use a single discrete torque reduction circuit. The torque reduction is performed by the engine control 2. Engine control units for controlling torque are well known in the art of electronic engine controls. Flowcharts FIGS. 4, 5 and 6 show programs executed by the computers or microprocessors of the motor vehicle drive of the invention. Flowchart FIG. 4 in particular shows the program executed by microprocessor P 19 of engine control 2 when reducing engine torque is required.

Flowchart FIG. 5 corresponds to the program executed when adapting computed operating pressure of transmission clutches, and the flowchart of FIG. 6 shows the control of operating pressure of the clutches.

The engine 4 is connected via a clutch 15 in well-known manner to the transmission 8 by a drive shaft 12. From the output of the transmission 8, a main output or driven shaft 13 leads to a drive axle, which in this case is only symbolically represented by a wheel 14.

The engine control 2 and the transmission control 3 are connected by a bidirectional data line 16, over which data are transmitted in both directions as is well known from the teachings of data transmission technology. Details of these data will be explained below in conjunction with the respective drawing figures.

Figure 2:
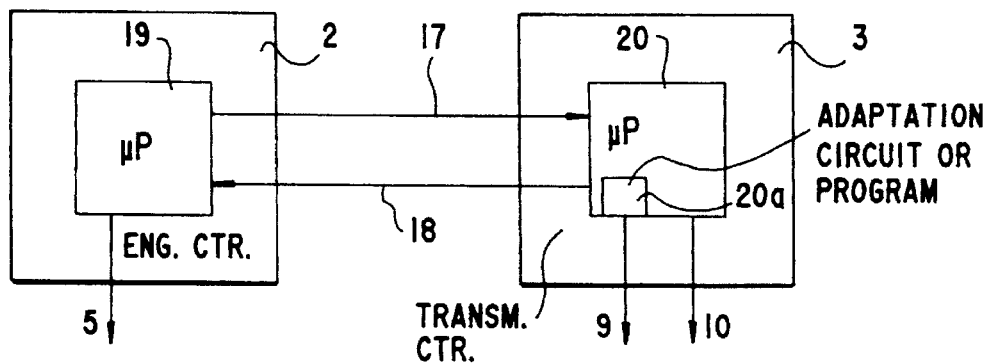
FIG. 2 is a block circuit diagram showing details of a first exemplary embodiment of the control of FIG. 1.

The aforementioned bidirectional data line is represented in FIG. 2 by two unidirectional data lines, namely a data line 17 from the engine control 2 to the transmission control 3, and a data line 18 in the opposite direction. The two data lines 17 and 18 connect a computer 19 contained in the engine control 2, with a computer 20 contained in the transmission control 3.

The computer 19 of the engine control 2 sends information on the instantaneous maximum intensity of the engine intervention over the data line 17 to the computer 20a of the transmission control 3. In other words, it sends information on a proportion by which the engine torque can be maximally reduced, for instance in the form of the maximum possible adjustment of the ignition angle toward "retard". The pressure adaptation circuit is shown as box 20a in FIG. 2. The torque reduction is performed by the computer or microprocessor 19 or 23 in the engine control 2 or 22 respectively, as described in more detail below. Therefore, the torque reduction circuit is actually a part of the computer. The transmission control 3 thereupon generates a signal by which the operating pressure of the clutches is adapted and sends it to the transmission over the line 9. In regard to the term "a proportion" for maximally reducing the torque, for instance by 20% of the engine torque, it should be noted that when the vehicle drive performs a shifting operation, the transmission control (TCU=transmission control unit) normally sends to the engine control (ECU) a tripping signal which changes the engine torque—for instance by 15% to 35%—during the shifting operation in order to get a jerk-free —operation. According to the invention the ECU sends a signal to the TCU preceding the tripping signal and, therefore, before the beginning of the shifting operation a data message (data) like: "be careful, the engine torque can not be reduced more than 20%". Thereby, difficulties can be avoided which would arise if the TCU would send to the ECU an order (tripping signal) to reduce the engine torque by e.g. 30%. A situation like that could arise for instance when the knocking regulation means of the ECU are activated, causing a power loss, as described above.

Under the problematic operating conditions discussed above, the operating pressure is increased in order to prevent an overly long slipping time of the friction elements in the transmission, since the torque reduction required by the transmission control cannot quite be attained, so that a higher torque must be transmitted upon shifting. The aforementioned information is transmitted from the transmission control 2 to the engine control 3 either continuously or at regular, predetermined time intervals.

Whenever shifting is to be done, the transmission control 3 sends a tripping signal for an engine engagement over the data line 18 to the engine control 2, which thereupon lowers the torque, specifically by the extent specified by the tripping signal.

In a second variant of the control, the data transmitted from the engine control 2 to the transmission control 3 over the data line 17 have the effect of postponing the instant of shifting in such a way that shifting does not occur until an operating range of the engine that has a reduced tendency toward knocking is reached, so that the tendency toward knocking does not increase after shifting.

In a third variant of the control circuit, the information transmitted over the data line 17 has the effect of deactivating a pressure adaptation circuit 20a contained in the transmission control 3. As long as this adaptation circuit 20 is in operation, it assures that the operating pressure of the clutches in the transmission is regulated in such a way that the slipping time of the friction elements in the transmission always remains in the correct range. An example that can be given for such a slipping time range would be 500 ms±80 ms. This slipping time may be briefly exceeded for shifting in the aforementioned problem cases.

Figure 3:
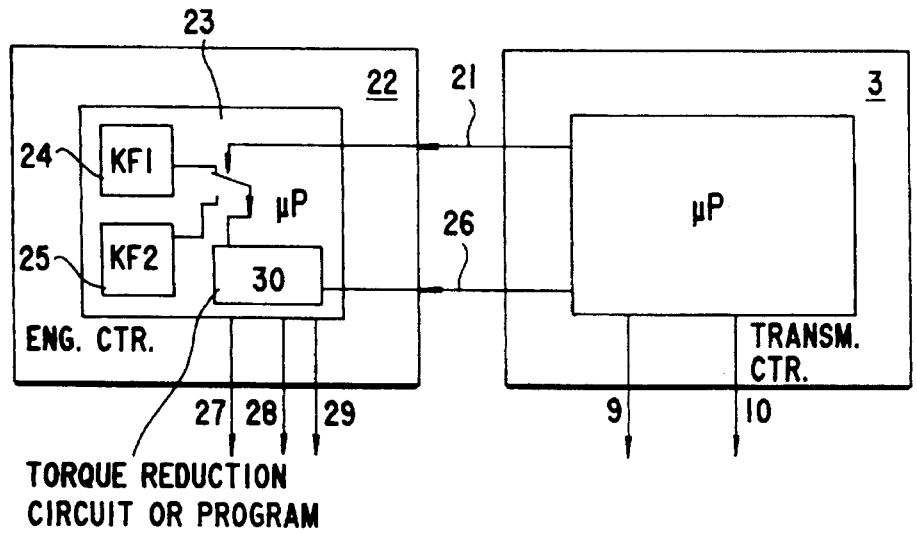
FIG. 3 is a block circuit diagram showing details of a second exemplary embodiment of the control of FIG. 1.

In the above-described exemplary embodiments, the influence of the engine control on the transmission control predominates in the preparatory phase of a shifting operation. In contrast, in a further exemplary embodiment, the influence of the transmission control on the engine control predominates in the preparatory phase. As is seen in FIG. 3, the transmission control 3 sends data that give notice of the shifting over a line 21 to an engine control 22. A computer 23 of this engine control 22 includes, among other elements, two basic engine performance graphs 24 and 25, stored in the computer memory, for the ignition vs. engine loading. By first giving notice of shifting, a shift is made from one basic performance graph 24 to the other basic performance graph 25, and as a result a regulating depth for the knocking regulation is reduced.

If the tripping signal then reaches the engine control 22 from the transmission control 3 over a data line 26, the engine control carries out a torque reduction, for instance by adjusting the ignition to retard, on the basis of the changed basic performance graph. The retardation of the ignition is effected by a signal that is transmitted to the engine over a line 27 from a torque reduction circuit 30 in the engine control 22.

In vehicles that are provided with an adjustable camshaft, the torque can also be effected by adjusting the camshaft. The corresponding signal is output by the reduction circuit 30 over a line 28. Another option is to transmit a signal over a line 29 to a non-illustrated device for adjusting an intake tube length. Through the use of this kind of adjustment as well, the engine torque can be varied, or in other words as a rule it can be reduced, during shifting. The torque reduction in all three cases is tripped by the tripping signal that reaches the torque reduction circuit 30 over the data line 26.

FIG. 4 is a flowchart showing calculation of ignition timing torque reduction based on the value of the engine spark angle, and wherein a spark angle offset for reducing the torque is based on engine speed and engine load. In this approach the basic spark angle is reduced by the calculated spark angle offset, followed by synchronization of the ignition according to the camshaft position.

FIG. 5 is a flowchart showing the calculation of the extent of the actually executable torque reduction and basing the shifting decision on this calculation.

FIG. 6 is a flowchart showing an approach to making a decision as to whether shifting is to be performed on the basis of knock control status data from e.g. microprocessor 19 of the engine control unit 2. In this approach the operating pressure Pop is calculated as a calculated adaptive pressure Pad added to the operating pressure Pop, and energizing the shifting actuator with the calculated operating pressure Pop.

It is noted, with regard to the "allowable range" defined for the slipping time of the clutches, that the range has a lower threshold and an upper threshold. The lower threshold is to prevent an uncomfortable jerk or jolt which the driver may notice. The upper threshold is defined when the slipping time would cause an undue wear of the friction elements in the transmission. The slipping time in an individual case depends on the respective transmission and on the engine power. Such a determination is easily made by the engineer and it is empirically defined.

We claim:

1. In a motor vehicle drive having an engine and an automatic transmission, a control for the motor vehicle drive comprising:

an engine control connected to the engine for controlling torque of the engine;

a transmission control connected to the transmission for controlling shifting operations of the transmission and connected to said engine control for sending a tripping signal to said engine control for changing torque and effecting a jerk-free shifting operation; and means for exchanging data between said engine control and said transmission control preceding the tripping signal, by transmitting information as to a proportion by which the torque can be maximally reduced from said engine control to said transmission control for maximally reducing the torque of the engine for the shifting operation.

2. In a motor vehicle drive having an engine and an automatic transmission, a control for the motor vehicle drive comprising:

an engine control connected to the engine for controlling torque of the engine;

a transmission control connected to the transmission for controlling shifting operations of the transmission and connected to said engine control for sending a tripping signal to said engine control for changing torque and effecting a jerk-free shifting operation; and means for exchanging data between said engine control and said transmission control preceding the tripping signal, by transmitting information as to a proportion by which the torque can be maximally reduced from said engine control to said transmission control for maximally reducing the torque of the engine for the shifting operation, wherein the transmission has clutches with an operating pressure and a slipping time, wherein said transmission control is operative for adapting the operating pressure of the clutches of the transmission so as to allow a maximum torque transfer for keeping the slipping time of the clutches within an allowable range in the shifting operation.

3. The control according to claim 1, wherein the transmission has clutches with an operating pressure and a slipping time, and including an adaptation device operative for controlling the operating pressure of the clutches of the transmission for keeping the slipping time of the clutches within an allowable range, said transmission control including deactivating means for deactivating said adaptation device during the shifting operation.

4. The control according to claim 1, including means for transmitting data in the form of a prior notification of a planned shifting operation from said transmission control to said engine control, after which said engine control varies a control range for the engine.

5. The control according to claim 4, including knocking regulating means having a range being controlled by said engine control.

6. In a motor vehicle drive having an engine and an automatic transmission, a control for the motor vehicle drive comprising:

an engine control connected to the engine for controlling torque of the engine;

a transmission control connected to the transmission for controlling shifting operations of the transmission and connected to said engine control for sending a tripping signal to said engine control for changing torque and effecting a jerk-free shifting operation; and means for exchanging data between said engine control and said transmission control preceding the tripping signal, by transmitting information as to a proportion by which the torque can be maximally reduced from said engine control to said transmission control for maximally reducing the torque of the engine for the shifting operation, wherein said means for exchanging data include a bidirectional data line operative for transmitting data in opposite directions connected between said engine control and said transmission control.

7. The control according to claim 1, wherein said engine control has a torque reduction device.

* * * * *